United States Patent Office 2,807,611
Patented Sept. 24, 1957

2,807,611
PROCESS FOR PRODUCING RIBOFLAVIN

Charles A. Howe, Elkton, Va., assignor to Merck & Co., Inc., Rahway, N. J., a corporation of New Jersey No Drawing. Application October 13, 1955,
Serial No. 540,333

5 Claims. (Cl. 260—211.3)

This invention is concerned generally with improvements in the manufacture of riboflavin. More particularly, it relates to an improved method for preparing riboflavin from ribitylxylidine utilizing as an intermediate the azo derivative formed by reacting ribitylxylidine with diazotized o-amino-biphenyl.

Heretofore, riboflavin has been prepared commercially by coupling ribitylxylidine (prepared in solution by hydrolysis of tetraacetylribitylxylidine) with benzene diazonium sulfate (diazotized aniline) to form the corresponding phenylazo-ribitylxylidine (i. e. 2-phenylazo-4,5-dimethyl-1-ribitylamino-benzene) and condensing the latter compound with barbituric acid to form riboflavin. The phenylazo intermediate and final riboflavin produced by this prior method have been relatively impure; accordingly, the maximum yield of U. S. P. riboflavin obtained from tetraacetylribitylxylidine by that method has been approximately 65% of theory.

I have now discovered an improved method whereby U. S. P. riboflavin can be prepared starting with tetraacetylribitylxylidine in a yield of over 80% of that theoretically obtainable. In this new method, the intermediate ribitylxylidine, obtained by hydrolysis of the tetraacetyl derivative, is coupled with an ortho biphenyl diazonium salt (diazotized o-amino-biphenyl) to form the corresponding azo derivative (i. e. 2-(o-biphenylazo)-4,5-dimethyl-1-ribitylamino-benzene); when the latter compound is condensed with barbituric acid, riboflavin is formed directly in sufficiently pure form for utilization in the supplementation of animal feeds; purification of this material results in an overall yield of U. S. P. riboflavin from tetraacetylribitylxylidine of over 80% of theory.

In accordance with my new process, ribitylxylidine, which is conveniently prepared by hydrolysis of tetraacetylribitylxylidine using known methods, is intimately contacted with an o-biphenyl diazonium salt (prepared by diazotization of o-amino-biphenyl) in an acidic aqueous medium, preferably an aqueous solution of acetic acid, while maintaining the temperature of the resulting mixture below about 10° C.; the resulting mixture is stirred at a temperature of about 0–5° C. for a period of about 24 hours, and the precipitated material is recovered by filtration or centrifugation, water-washed and air-dried to give 2-(o-biphenylazo)-4,5-dimethyl-1-ribitylamino-benzene, which is obtained in the form of a granular, orange product, assaying nearly 95% pure.

The 2-(o-biphenylazo)-4,5-dimethyl-1-ribitylamino-benzene is then condensed, without further purification, with barbituric acid. This condensation reaction is conducted by heating the reactants together, at a temperature of about 70 to 125° C. and for a period of about 5 to 100 hours, in a solvent for the reactants as, for example, a mixture of a lower alkanoic acid and a lower alkyl alkanoate such as acetic acid-butyl acetate, acetic acid-ethyl acetate, and the like. It is preferred to utilize, as the solvent, a mixture of acetic acid and ethyl acetate and to carry out the reaction at the reflux temperature of the reaction mixture, under which conditions the condensation reaction is ordinarily complete in about 90 hours. The reaction mixture is cooled to about 0–10° C., the precipitated material is recovered by filtration, washed with cold ethyl acetate then with water and air-dried to give crude riboflavin in a yield of nearly 100% of theory based on the 2-(o-biphenylazo)-4,5-dimethyl-1-ribityl-amino-benzene. The riboflavin thus obtained is sufficiently pure for use in the supplementation of animal feeds. This crude riboflavin is purified by conventional methods to give U. S. P. riboflavin in an overall yield of over 80% of theory from tetraacetylribitylxylidine.

The following example illustrates a method of carrying out the present invention, but it is to be understood that this example is given for purposes of illustration and not of limitation.

Example 1

A solution of o-biphenyl diazonium sulfate is prepared as follows: o-amino-biphenyl, 21.1 grams (0.125 mole), is dissolved by warming in a mixture of 100 ml. of glacial acid and 136 ml. of water. To this solution is added a mixture 11.2 ml. of concentrated sulfuric acid and 25 ml. of water. The temperature is then lowered to 0 to 5° C. and 8.65 g. (0.125 mole) of sodium nitrite is added in small portions to the stirred solution over a one hour period. The solution is stirred for an additional two hours at 0 to 5° C. after the addition of the nitrite is complete.

A solution of ribitylxylidine is prepared as follows: a stirred suspension of 42.3 g. (0.10 mole) of tetraacetylribitylxylidine and 85 ml. of water is heated to 95 to 100° C. To this material is added, over a five to 10 minute period, exactly 0.40 mole of aqueous 25 to 30 percent aqueous sodium hydroxide solution, the temperature being held at 95 to 100° C. Shortly after the addition of the caustic solution, the mixture becomes homogeneous, the temperature rises suddenly, and a rapid evolution of steam occurs. The light, straw-colored solution is then stirred for a one hour period at 95 to 100° C. to insure completeness of reaction. With the resulting ribitylxylidine solution at a temperature of 90° C., 166 ml. of 57.5 percent (v./v.) aqueous acetic acid is added, and the solution is then cooled to 0 to 5° C.

The solution of o-biphenyl diazonium sulfate is now added to the ribitylxylidine solution at such a rate as to maintain the temperature of the resulting mixture below 8° C. The mixture is then stirred at 0 to 5° C. for 24 hours. After the stirring period is complete the crude product is isolated by filtration; the wet product is slurried in 500 ml. of water, refiltered, washed with 200 ml. of water, and air-dried at 50 to 60° C. The dried material is pulverized to give about 44 g. of 2-(o-biphenylazo)-4,5-dimethyl-1-ribitylamino-benzene which is obtained as a granular, orange product; M. P. 134–139° C., dec.

To a mixture of 225 ml. of ethyl acetate and 40.5 ml. of glacial acetic acid is added 43.6 g. (0.10 mole) of 2-(o - biphenylazo) - 4,5-dimethyl-1-ribitylamino-benzene, prepared as described above, and 16.9 g. (0.132 mole) of barbituric acid. The resulting mixture is heated under reflux with stirring for about 90 hours, at the end of which period an 0.5 ml. test sample of the reaction solution, when mixed with 15 ml. of 26% aqueous hydrochloric acid, gives a light straw color showing completion of the reaction. If the reaction is incomplete, the reaction mixture is heated under reflux for additional five hours periods until a test for completion of the reaction is obtained. The reaction mixture is coled to 10° C. for one hour and filtered. The crude product is washed successively with 50 ml. of cold ethyl acetate and 50 ml of cold water, then air-dried at 70° C. to give about 37 g. of crude riboflavin, which is obtained as a brownish-yellow powder; yield approximately 98.5% of theory.

Crude riboflavin, prepared as described above starting with 43.6 g. of 2-(o-biphenylazo)-4,5-dimethyl-1-ribitylamino-benzene, is washed with 50 ml. of cold ethyl acetate, slurried with 180 ml. of methanol at 65° C. for thirty minutes. The methanol slurry is cooled to 10° C. for thirty minutes, filtered, and the filtered material is washed with 40 ml. of cold methanol. The methanol-washed riboflavin is then slurried with 180 ml. of water at 80° C. for thirty minutes, the slurry is cooled to 70° C., filtered, and the filtered material is washed with 40 ml. of hot (70° C.) water. The hot water-washed riboflavin is dissolved in a mixture of 70 ml. of C. P. hydrochloric acid and 23 ml. of water by warming to 45° C. The aqueous hydrochloric acid solution is treated with ca. 1.5 ml. of 30 percent hydrogen peroxide solution to oxidize impurities and filtered through a filter precoated with diatomaceous silica (Super-Cel). The oxidized, filtered solution is poured, with vigorous agitation, into 900 ml. of water at 95 to 100° C. The resulting riboflavin slurry is cooled slowly to 10° C., filtered, and the filtered material is washed successively with two 50 ml.-portions of water and four 50 ml.-portions of methanol. The washed material is air-dried, at 70° C., to give about 30 g. of riboflavin; yield about 80% of theory based on the 42.3 g. of tetraacetylribitylxylidine used as starting material.

Various changes and modifications may be made in carrying out the present invention without departing from the spirit and scope thereof. Insofar as these changes and modifications are within the purview of the annexed claims, they are to be considered as part of my invention.

I claim:

1. The process which comprises reacting ribitylxylidine with an o-biphenyl diazonium salt to form 2-(o-biphenylazo)-4,5-dimethyl-1-ribitylamino-benzene, and reacting the latter compound with barbituric acid to form riboflavin.

2. The process which comprises reacting ribitylxylidine with an o-biphenyl diazonium salt to form 2-(o-biphenylazo)-4,5-dimethyl-1-ribitylamino-benzene.

3. The process which comprises reacting 2-(o-biphenylazo)-4,5-dimethyl-1-ribitylamino-benzene with barbituric acid to form riboflavin.

4. In the process of producing riboflavin by coupling ribitylxylidine with a diazonium salt followed by condensation of barituric acid with the intermediate azo derivative thus formed, the improvement which comprises utilizing, as said salt, diazotized o-amino-biphenyl, thereby producing riboflavin in substantially enhanced yield.

5. 2 - (o - biphenylazo) - 4,5-dimethyl- 1-ribitylamino-benzene.

References Cited in the file of this patent

UNITED STATES PATENTS

| | | |
|---|---|---|
| 2,350,376 | Tishler et al. | June 6, 1944 |
| 2,370,093 | Tishler et al. | Feb. 20, 1945 |